Jan. 13, 1959

C. J. WESTLING 2,868,397

MANIPULATOR

Filed Nov. 13, 1952

INVENTOR.
CARL J. WESTLING
BY
HIS ATTORNEYS

Jan. 13, 1959  C. J. WESTLING  2,868,397
MANIPULATOR

Filed Nov. 13, 1952  5 Sheets-Sheet 3

INVENTOR.
CARL J. WESTLING
BY
HIS ATTORNEYS

Jan. 13, 1959 C. J. WESTLING 2,868,397
MANIPULATOR
Filed Nov. 13, 1952 5 Sheets-Sheet 4

INVENTOR.
CARL J. WESTLING
BY
HIS ATTORNEYS

INVENTOR.
CARL J. WESTLING
BY
HIS ATTORNEYS

United States Patent Office 2,868,397
Patented Jan. 13, 1959

2,868,397

MANIPULATOR

Carl J. Westling, Pittsburgh, Pa., assignor to Vulcan Research Corporation, Pittsburgh, Pa., a corporation of Pennsylvania Application November 13, 1952, Serial No. 320,287

21 Claims. (Cl. 214—27)

This invention relates to manipulators for manipulating work for performance on the work of operations such, for example, as forging, for charging work into and withdrawing the same from heating furnaces and for other uses.

While my invention has wide adaptability and possesses advantages in different fields I have found it to have exceptional usefulness in a manipulator mounted on a lift truck. A lift truck is a vehicle comprising a carriage, means upon which the carriage is mounted for movement from place to place upon a floor or track, a generally upright guideway carried by the carriage and a support movable in the guideway to selected elevations. The guideway may be and preferably is mounted on the carriage for tilting movement to selected angles to the horizontal. A lift truck manipulator has great advantages in the handling of work for forging and like operations and in the handling of billets or the like into and out of heating furnaces. Such a manipulator is relatively compact, inexpensive, light in weight and easily and rapidly operable. However, its nature is such that the peel or work holder and its carrier cannot project horizontally from the support as far as in other types of manipulators. I have devised a manipulator structure which is ideally suited to a lift truck manipulator and for the first time makes such a manipulator feasible for uses such as those above mentioned.

My manipulator comprises a support, a hollow generally cylindrical peel carrier carried by the support for turning movement generally about its axis and, preferably, a peel operator disposed within the peel carrier and operatively disposable generally axially of the peel carrier. The support is preferably generally in the form of a hollow cylinder. The peel carrier preferably has bearing both within the support and upon the outer surface thereof. In a preferred form of structure I provide means cooperating with the peel carrier at the portion thereof having bearing upon the outer surface of the support for turning the peel carrier.

My manipulator preferably comprises a peel carrier having bearing within the support and projecting from an end of the support and having additional bearing upon the outer surface of the support adjacent said end of the support together with a hollow peel connected with the projecting portion of the peel carrier and a peel operator disposed within the peel carrier and peel and operatively displaceable generally axially of the peel carrier and peel.

The support is preferably removably connected with the base at one end of the support and projects from the base and the support is preferably open at its opposite end and the peel carrier preferably projects from the second mentioned end of the support. Removable means may be provided which are accessible from the first mentioned end of the support when the support is removed from the base maintaining the peel carrier against withdrawal from the support through the second mentioned end of the support.

I preferably provide bearing means within the support fixedly positioned axially of the support and mounting the peel carrier in the bearing means for turning movement generally about its axis, and I preferably employ removable means connected with the peel carrier and abutting the bearing means maintaining the peel carrier in place in the support.

The peel operator may have a piston within and operable axially of the peel carrier and the peel carrier may have ports for the admission of fluid at opposite ends of the piston. In such case the support is provided with fluid passages communicating respectively with the ports. Means are preferably provided sealing the peel carrier to the support intermediate said ports and passages so that each passage communicates with but one of the ports.

The peel carrier preferably has a hollow generally cylindrical portion whose outside diameter is substantially less than the inside diameter of the opposed portion of the support and sealing means are preferably provided sealing the peel carrier to the support adjacent the ends of said portions of the peel carrier and support and also at a zone intermediate said ends whereby transverse passages are provided between the sealing means at said zone and the sealing means at said ends respectively, the ports in the peel carrier communicating respectively with said transverse passages. In a preferred structure I provide sealing rings sealing the peel carrier to the support adjacent the ends of the aforesaid portions of the peel carrier and support, another sealing ring sealing the peel carrier to the support at a zone intermediate said ends and a spacing ring between the last mentioned sealing ring and each of the first mentioned sealing rings, each of the spacing rings having a passage therethrough.

Desirably the peel carrier has an abutment portion abutting the outer end of one of the outer sealing rings and removable means are carried by the peel carrier normally bearing against the outer end of the other of the outer sealing rings to maintain the sealing rings and spacing rings in position but when removed permitting removal and replacement of the sealing rings and spacing rings.

The peel operator preferably has a portion disposed within the peel carrier and a portion projecting from an end thereof, and a removable and replaceable sealing unit is preferably provided which is disposable in the end of the peel carrier through which the peel operator projects sealing the peel operator to the peel carrier while permitting operative displacement of the peel operator generally axially of the peel carrier. The peel operator preferably has a piston disposed and operable within the peel carrier and means are preferably provided for admitting fluid under pressure within the peel carrier to operate the piston together with sealing means at the end of the peel carrier through which the peel operator projects.

In a preferred structure my manipulator comprises a generally upright guideway together with a support movable in the guideway to selected elevations, a hollow generally cylindrical peel carrier carried by the support for turning movement generally about its axis and a peel operator disposed within the peel carrier and operatively displaceable generally axially of the peel carrier. I may provide a wheeled carriage carrying the generally upright guideway. Desirably means are provided for turning the guideway to selected angles to the horizontal.

In its preferred form my manipulator comprises a lift truck having a generally upright guideway, a hollow generally cylindrical support movable in the guideway to selected elevations, a hollow generally cylindrical peel carrier mounted in the support for turning movement generally about its axis and a peel operator disposed within the peel carrier and operatively displaceable generally axially of the peel carrier.

Other details, objects and advantages of the invention will become apparent as the following description of a present preferred embodiment thereof proceeds.

In the accompanying drawings I have shown a present preferred embodiment of the invention in which Figure 1 is a side elevational view of a lift truck manipulator;

Figure 1:
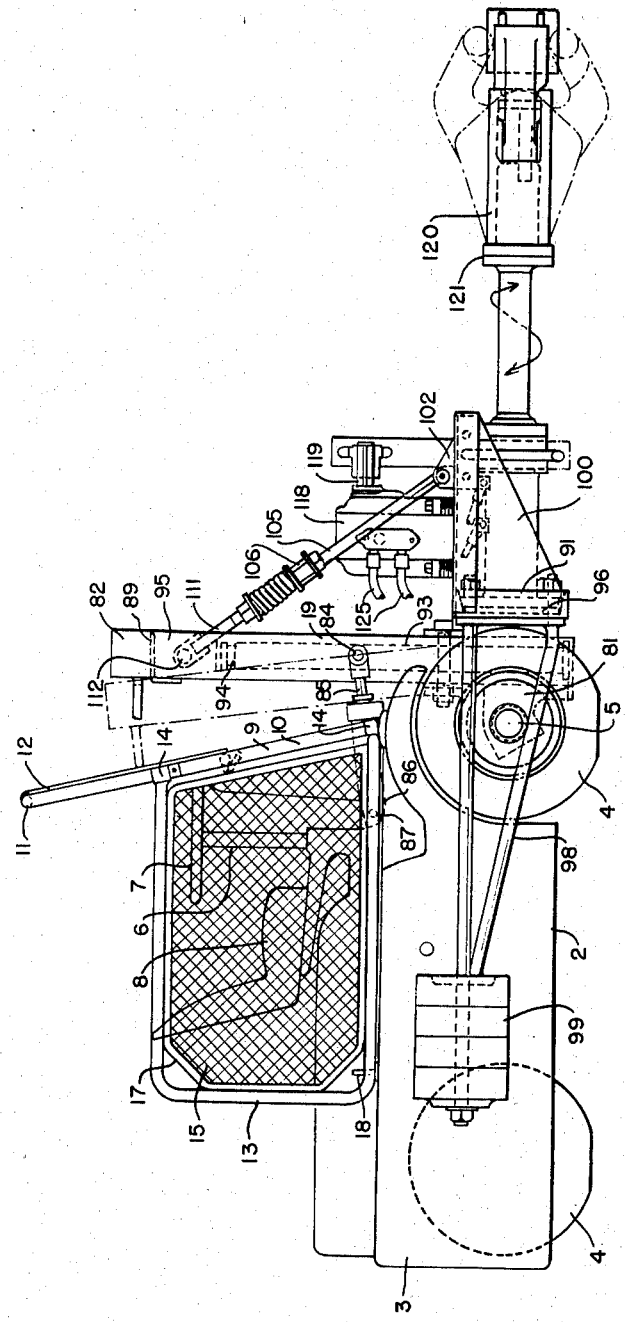
Figure 2:
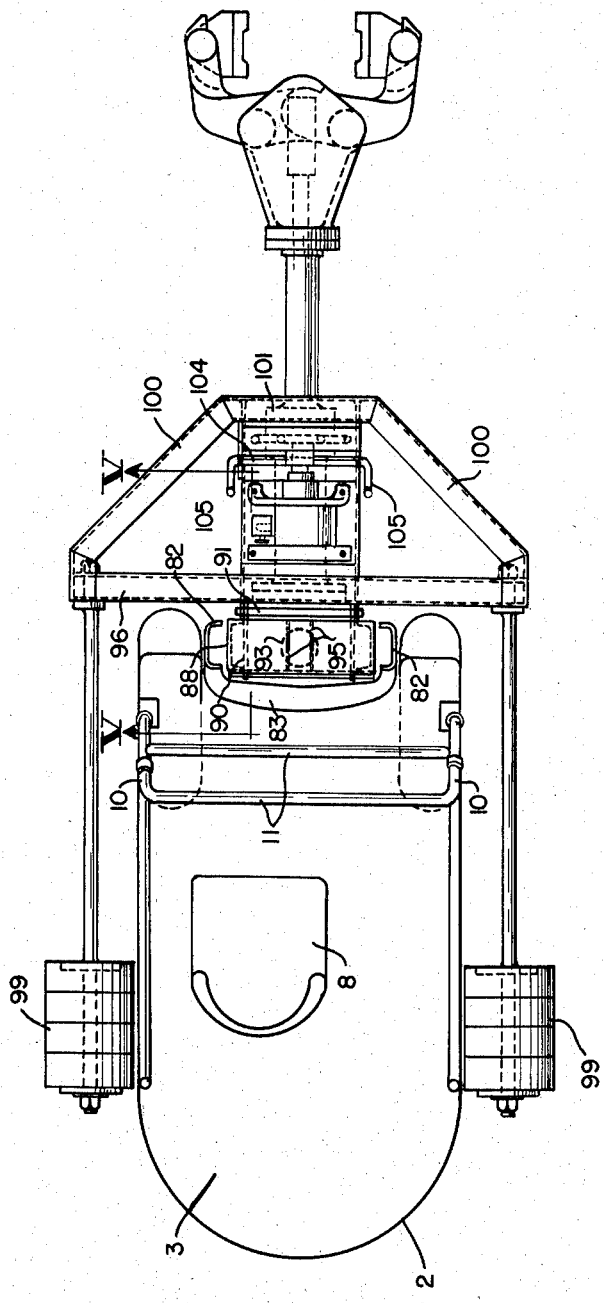
Figure 2 is a fragmentary top plan view of the lift truck manipulator shown in Figure 1.
Figure 3:
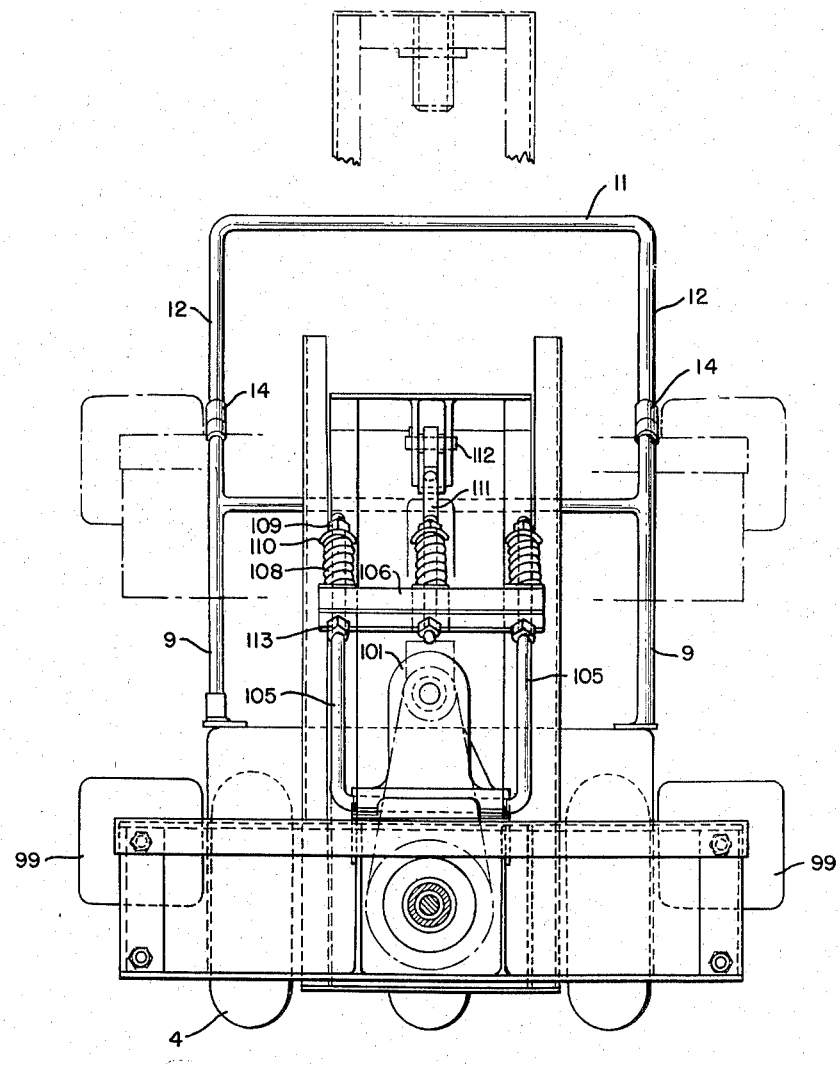
Figure 3 is a front elevational view of the lift truck manipulator shown in Figures 1 and 2.
Figure 4:
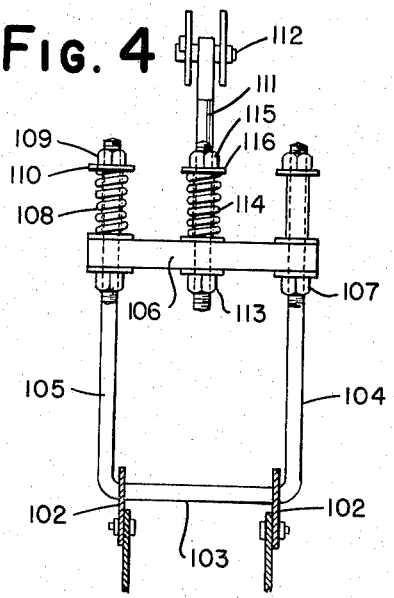
Figure 4 is a fragmentary view partly in cross section of a portion of the structure shown in Figure 1.
Figure 5:
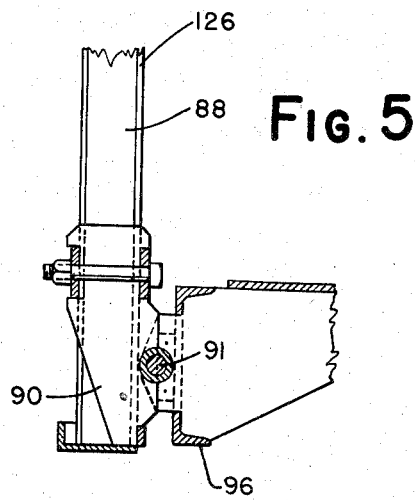
Figure 5 is a fragmentary cross-sectional view taken on the line V—V of Figure 2.

Referring now more particularly to the drawings, the manipulator shown therein comprises a lift truck designated generally by reference numeral 2 and which so far as the invention herein claimed is concerned may be of conventional construction although the particular form of lift truck herein shown has important advantages and is claimed in my copending application Serial No. 353,826, filed May 8, 1953, now Patent No. 2,811,881. The lift truck shown comprises a body 3 mounted for movement from place to place upon a floor or track on wheels 4 shown as being rubber tired. Normally the manipulator operates upon a floor in which case the wheels 4 preferably have rubber tires as shown although the manipulator may be used upon a track in which case the wheels 4 may be flanged metal car wheels. In the structure shown there are two front wheels 4 mounted upon an axle 5 which may be driven to move the manipulator from place to place and a single rear wheel 4 mounted for turning movement in a generally horizontal plane to steer the truck. Steering gear which may be conventional is provided, the gear being operated through a shaft 6 provided with a steering wheel 7. The operator sits in a seat 8 mounted on the body 3. In front of the operator's seat and the steering wheel is a tubular steel frame 9 having upwardly extending and somewhat rearwardly inclined side members 10 and cross members 11. A heat shield 12 is mounted on the frame 9 to protect the operator from the heat of the work being handled by the manipulator or the heat of a furnace into which the work is charged or from which it is withdrawn. At each side of the driver's seat is a tubular metal frame 13 swingably mounted on the member 10 at that side of the body at 14 so that it can be swung outwardly to permit the operator or mechanic to get at or service the mechanism of the lift truck. Wire mesh 15 mounted in an inner frame 17 is mounted in each of the frames 13. A latch 18 is provided for latching each of the frames 13 in closed position. The side frames 13 when mounted as shown on the inclined side members 10 tend to swing by gravity to closed position. The side frames constitute guards to protect the operator from the rearwardly extending counterweight arms presently to be described.

Mounted on the front axle 5 for limited turning movement about the axis of the front axle is a frame 19. The frame 19 has at its bottom projecting portions 81 having bearing upon the axle 5 and opposed side members 82 connected by a cross member 83. The side members 82 are in the form of inwardly open channels and cooperatively form a guideway in which the manipulator crosshead, presently to be described, operates. The frame 19 has pivotally connected therewith at each side thereof at 84 a piston rod 85 connected with a piston in a cylinder 86 pivoted to the body 3 at 87 whereby the frame 19 may be moved through a small angle about the axis of the axle 5 to alter the inclination relatively to the horizontal of the manipulator crosshead and hence of the peel presently to be described which is carried by the crosshead. The frame 19 is shown in solid lines in Figure 1 in substantially vertically upright position and in chain lines in an angular position a few degrees removed from the solid line position and to the left. The frame 19 may likewise be turned to the right from the solid line position through a small angle by operation of the pistons in the cylinders 86.

The crosshead of the manipulator, which is designated generally by reference numeral 126, comprises elongated generally vertical side members 88 connected at the top by a transverse member 89 and having at the bottom members 90 to which is pivotally connected at 91 a cross member 96. Thus the crosshead 126 is generally vertically elongated. Mounted centrally at the bottom of the frame 19 is a cylinder 93 in which operates a piston having a piston rod 94 connected with the transverse member 89 of the crosshead through members 95. By operation of the piston in the cylinder 93 the crosshead is moved up and down in the guideway formed by the channels 82 and may be moved to selected positions in the guideway.

From the ends of the cross member 96 depend generally vertical members 97 rigidly connected with the cross member. Connected with and extending rearwardly from the cross member 96 and the members 97 at both sides of the body are arms 98 respectively carrying at their rearward ends counterweights 99. The purpose of the counterweights is to counterbalance the mass of the portion of the manipulator structure which projects forwardly from the pivot 91.

The mass of the portion of the manipulator structure which projects forwardly from the pivot 91 is counterbalanced for several reasons. Lift trucks are rated as to their lift capacity for specific loads which vary downwardly as the horizontal distance of the load from the vertical track of the lift truck increases. The maximum load capacity is attained when the load is close to the track. Consequently it is of considerable importance to design the lift truck so that the center of gravity of the manipulator mechanism is at or close to the vertical track. Moreover, it is important to obtain proper distribution of mass in the peel with respect to its support in order to minimize or cancel out the shocks required when work held by the manipulator is being forged. Such shocks if not properly compensated for could result in rapid deterioration of the lift truck and manipulator mechanism.

Projecting forwardly and inwardly from the ends of the cross member 96 are inclined members 100 joined at their forward ends by a transverse member 101. The member 101 carries a pair of upwardly projecting lugs 102 through which passes the cross element 103 of a yoke 104 having opposed generally upwardly and rearwardly inclined side members 105. A bar 106 extends transversely of the yoke 104 generally parallel to the cross element 103, each of the side members 105 of the yoke passing through the bar 106. The upper end of each of the members 105 is threaded and each such member has a nut 107 thereon below the bar 106. Each of the members 105 has a coil spring 108 disposed thereabout above the bar 106, a nut 109 and a washer 110 being applied above the spring.

A rod 111 is pivotally connected with the upper portion of the crosshead at 112 and extends downwardly and toward the right viewing Figure 1 and passes through the bar 106, a nut 113 being threaded onto the lower end of the rod 111 below the bar 106. A coil spring 114 surrounds the rod 111 above the bar 106 and a nut 115 and washer 116 are applied to the rod 111 above the spring 114.

Thus the crosshead and hence the peel carried thereby presently to be described is maintained in approximately predetermined orientation but is turnable about the axis of the pivot 91 when subjected to shock as when work being held by the peel is being forged. Clockwise turning of the crosshead about the axis of the pivot 91 viewing Figure 1 is resiliently resisted by the springs 108 on the members 105 while counterclockwise turning of the manipulator head is resiliently resisted by the spring 114 on the rod 111. Thus the shocks imparted to the peel are considerably reduced in intensity before they are transmitted to the truck. Since both the peel and the structure 100, 101, 102 are carried by and rigidly connected with the cross member 96 and yoke 104 is connected with and in effect acts on the peel; in other words, the structure 96, 100, 101, 102 may be regarded as part of the peel.

The cross member 96 has a web in the form of a plate 16 to which is welded at 20 a ring 21 into which bolts 22 are threaded. Any appropriate number of such bolts may be employed, it being my preference to use eight bolts equally spaced about the ring 21. The ring 21 has an inner axial annular flange 23.

Figure 6:
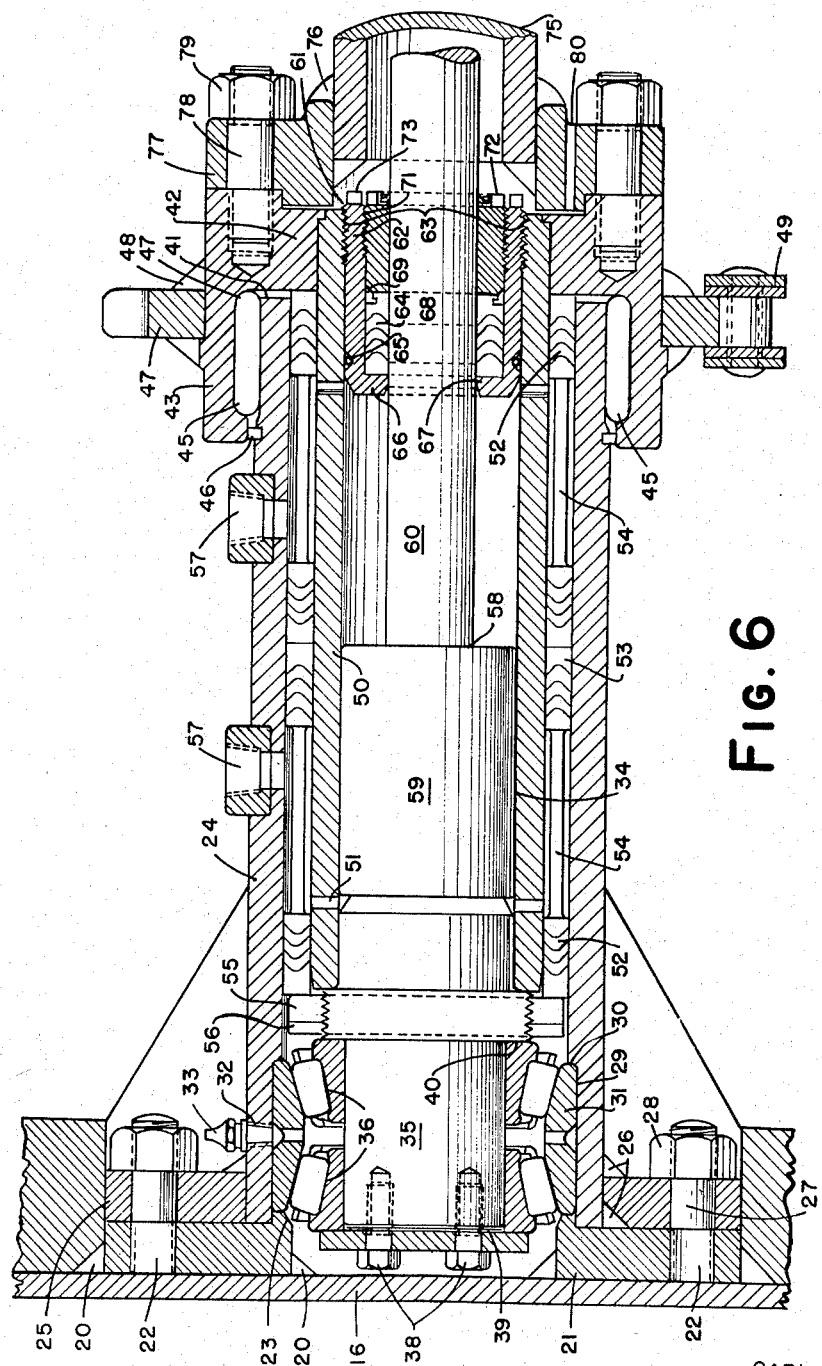
Figure 6 is a fragmentary vertical central cross-sectional view to enlarged scale through a portion of the manipulator.

The principal element of the support for the peel carrier and peel operator is a cylinder 24 having a flange 25 welded to one end at 26. The flange 25 is provided with bolt holes 27 to receive the bolts 22 and nuts 28 are applied to the bolts to the right of the flange 25 viewing Figure 6 and are drawn up tightly against the flange whereby to unitarily attach the cylinder 24 to the ring 21 and hence to the plate 16. Adjacent its left-hand end viewing Figure 6 the cylinder 24 is counterbored as shown at 29 and the end of the cylinder telescopes over the flange 23 as shown. The counterbore 29 provides a radial annular shoulder 30 within the cylinder 24. A bearing race 31 is disposed between the shoulder 30 and the end face of the flange 23 as shown in Figure 6. The parts are proportioned so that when the nuts 28 are tightened the bearing race 31 is maintained firmly in place and held against axial movement. The cylinder 24 has a bore 32 which is tapped and receives a lubrication fitting 33 through which lubricant may be introduced to lubricate the bearing within the bearing race 31.

The peel carrier, which is designated generally by reference numeral 34, comprises a cylindrical end portion 35 which is mounted for rotation in a combination radial and double thrust tapered roller bearing 36 disposed within the race 31. A plate 37 is bolted to the end of the peel carrier by bolts 38, there preferably being three such bolts having their axes arranged as the apices of an equilateral triangle equidistant from the axis of the peel carrier. Shims 39 may be provided between the end face of the peel carrier 34 and the plate 37 if needed. The bearing 36 not only provides for mounting of the peel carrier for rotation within the cylinder 24 but also maintains the peel carrier against axial movement. The bolts 38 are rendered accessible by removal of the cylinder 24 from the plate 16. The bearing is confined between a shoulder 40 of the peel carrier and the plate 37.

The outer extremity of the cylinder 24 is shown at 41. Slightly to the right of that extremity the peel carrier 34 has an annular radial flange 42. At the outer extremity of the flange 42 is an annular axial flange 43 which extends toward the left from the flange 42 viewing Figure 6. The flange 43 is provided at its inner surface with a bearing roller receiving cavity 44 in which are disposed bearing rollers 45 bearing against the outer face of the cylinder 24 at its right-hand extremity. A sealing ring 46 is provided to prevent increase of foreign matter into the bearing comprising the rollers 45. Thus the peel carrier 34 is mounted for rotation within the cylinder 24 by the bearings 36 and 45 and is maintained against axial movement by the bearing 36. For turning the peel carrier 34 it is provided with a sprocket 47 which is welded to the exterior surface of the flange 43 as shown at 48. A sprocket chain 49 is trained about the sprocket 47 and about a driving sprocket 117 presently to be described, turning of the driving sprocket turning the peel carrier 34.

The peel carrier 34 has a cylindrical portion 50 whose outside diameter is substantially less than the inside diameter of the opposed portion of the cylinder 24. Ports 51 extend through the peel carrier 34 near the ends of the portion 50. Sealing rings 52 seal the peel carrier 34 to the cylinder 24 to the left of the left-hand ports 51 and to the right of the right-hand ports 51 viewing Figure 6. A double sealing ring 53 seals the peel carrier 34 to the cylinder 24 approximately midway between the sealing rings 52. Spacing rings 54 are disposed between the sealing ring 53 and the respective sealing rings 52. The right-hand extremity of the right-hand sealing ring 52 viewing Figure 6 abuts against the flange 42. A nut 55 is threaded onto an externally threaded portion 56 of the peel carrier 34 and is turned up against the left-hand face of the left-hand sealing ring 52. A lock nut 56 holds the nut 55 in position. Thus the sealing rings 52 and 53 and the spacing rings 54 are maintained in position on the peel carrier 34 and turn with the peel carrier when the peel carrier is turned within the cylinder 24. The spacing rings 54 have passages therethrough communicating respectively with the corresponding ports 51. Also, fluid passages 57 are provided through the cylinder 24 communicating with the respective passages through the spacing rings 54 and thence with the corresponding ports 51. By supplying fluid under pressure through one or the other of the passages 57 the peel operator now to be described may be operated within the peel carrier 34. When fluid under pressure is admitted through one or the other of the passages 57 the resultant axial thrust is self-contained within the reel carrier assembly and therefore the thrust does not affect or resist the turning movement of the peel.

The peel operator is designated generally by reference numeral 58 and has a portion disposed within the peel carrier 34 and a portion projecting to the right therefrom as shown in Figure 6. The peel operator 58 comprises a piston 59 operable within the cylindrical bore in the portion 50 of the peel carrier. A rod 60 is connected with the piston 59 and extends to the right therefrom viewing Figure 6.

I provide a sealing unit, designated generally by reference numeral 61, adapted to be applied to the right-hand end of the peel carrier 34 viewing Figure 6 to seal the rod 60 thereto while providing for axial movement of the peel operator. A sealing unit comprises a cup 62 snugly receivable in the right-hand end of the peel carrier 34 and adapted to be threadedly connected therewith through complementary threads 63. The cup 62 has an annular recess 64 receiving an O-ring 65 for sealing the cup to the interior of the peel carrier 34. The transverse wall 66 of the cup has therethrough a bore 67 to receive the rod 60, and a packing ring 68 is disposed within the cup to seal against the rod. The packing ring 68 has a reentrant portion 69 at its outer end to receive a hook-like tool for withdrawing it. The packing ring 68 is pressed into place by a pressure ring 70 threaded into the cup 62 by complementary threads 71. A seal 72 is provided to keep foreign matter out of the peel carrier when the rod 60 moves toward the left viewing Figure 6.

The packing ring 68 may be changed without removing the cup 62 or the entire sealing assembly may be removed if desired. Wrench engaging lugs 73 are provided on the cup 62 and similar lugs 74 are provided on the pressure ring 70.

The peel proper is designated 75 and comprises a tubular member to which is welded at 76 a flange 77 through which the peel is bolted to the peel carrier 34 by bolts 78 threaded into the flange 42. Nuts 79 are applied to the bolts 78. A passage 80 is provided through which any fluid leaking past the sealing unit 61 may emerge to indicate that a seal should be replaced.

Mounted atop the cylinder 24 is an oil motor 118 having a driven shaft 119 to which is fixed the previously mentioned sprocket 117. The sprocket chain 49 as above stated is trained about the sprocket 47 and about the sprocket 117 so that the motor 118 turns the peel carrier 34. Flexible oil connections 125 extend to the oil motor.

The peel 75 has tongs comprising a mounting member 120 connected therewith at 121. Pivoted to the mounting member 120 of the tongs at 122 are jaws 123 each in the form of a bell-crank lever having one arm extending inwardly and having a pivot and slot connection 124 with the rod 60.

The tongs might be mounted directly against flange 42 without the interposition of the member 75 which has been referred to as the peel proper but which in the structure shown in the drawings constitutes a spacer tube which may be lengthened, shortened or dispensed with. The length of the tube 75 and of the rod 60 will, in any case, be determined to suit the particular operation for which the manipulator is furnished.

The portion of my manipulator structure shown in Figure 6 is unprecedently short-coupled and hence adapted for utilization in a lift truck manipulator. At the same time it is very strong and rugged and operates in a simple manner and is not likely to become out of order. Although such structure is exceptionally well adapted to employment in a lift truck manipulator it may also be used in other manipulators with advantages in economy of construction, strength, foolproofness and simplicity of operation.

Moreover, the portion of my manipulator structure shown in Figure 6 is unprecedentedly short-coupled for a mechanism which is intended to not merely operate the tongs at the end of the peel but also have a rotating action. Peel mechanisms have heretofore been proposed for charging work into and withdrawing the same from furnaces and the like which have been provided with tongs and means for operating the tongs but not with means for peel rotation. In such cases either the cylinders for operating the tongs have been mounted outside the peel structure or, if they have been within the peel structure on the peel axis, no provision has been made for rotatable connections for the admission of fluid under pressure at opposite sides of the piston. My structure as herein disclosed does away with all swivel connections, bulky piping and excessive axial length.

Subject matter shown but not claimed herein is claimed in my copending applications Serial No. 353,826, filed May 8, 1953, Serial No. 470,625, filed November 23, 1954, and Serial No. 633,101, filed January 8, 1957.

While I have shown and described a present preferred embodiment of the invention it is to be distinctly understood that the invention is not limited thereto but may be otherwise variously embodied within the scope of the following claims.

I claim:

1. A manipulator comprising a base, a support generally in the form of a hollow cylinder removably connected with the base at one end of the support and projecting from the base, the support being open at its opposite end, a hollow generally cylindrical peel carrier mounted in the support for turning movement generally about its axis and projecting from the second mentioned end of the support, and removable means accessible from the first mentioned end of the support when the support is removed from the base maintaining the peel carrier against withdrawal from the support through the second mentioned end of the support.

2. A manipulator comprising a base, a support generally in the form of a hollow cylinder removably connected with the base at one end of the support and projecting from the base, the support being open at its opposite end, a hollow generally cylindrical peel carrier mounted in the support and projecting from the second mentioned end of the support, bearing means within the support fixedly positioned axially of the support, the peel carrier being mounted in the bearing means for turning movement generally about its axis, and removable means connected with the peel carrier and abutting the bearing means maintaining the peel carrier against withdrawal from the support through the second mentioned end of the support.

3. A manipulator comprising a base, a support generally in the form of a hollow cylinder removably connected with the base at one end of the support and projecting from the base, the support being open at its opposite end, a hollow generally cylindrical peel carrier mounted in the support and projecting from the second mentioned end of the support, bearing means within the support fixedly positioned axially of the support, the peel carrier being mounted in the bearing means for turning movement generally about its axis, and removable means connected with the peel carrier and abutting the bearing means maintaining the peel carrier against withdrawal from the support through the second mentioned end of the support, the removable means being accessible from the first mentioned end of the support when the support is removed from the base.

4. A manipulator comprising a hollow generally cylindrical support, a hollow generally cylindrical peel carrier mounted in the support for turning movement generally about its axis and a peel operator having a piston within and operable axially of the peel carrier, the peel carrier having ports for the admission of fluid at opposite ends of the piston and the support having fluid passages communicating respectively with said ports.

5. A manipulator comprising a hollow generally cylindrical support, a hollow generally cylindrical peel carrier mounted in the support for turning movement generally about its axis, a peel operator having a piston within and operable axially of the peel carrier, the peel carrier having ports for the admission of fluid at opposite ends of the piston and the support having fluid passages communicating respectively with said ports, and means sealing the peel carrier to the support intermediate said ports and passages so that each passage communicates with but one of the ports.

6. A manipulator comprising a hollow generally cylindrical support, a peel carrier mounted in the support for turning movement generally about its axis and having a hollow generally cylindrical portion whose outside diameter is substantially less than the inside diameter of the opposed portion of the support, sealing means sealing the peel carrier to the support adjacent the ends of said portions of the peel carrier and support and also at a zone intermediate said ends whereby transverse passages are provided between the sealing means at said zone and the sealing means at said ends respectively, a peel operator having a piston within and operable axially of the generally cylindrical portion of the peel carrier, the peel carrier having ports for admission of fluid at opposite ends of the piston respectively communicating with said transverse passages and the support having fluid passages respectively communicating wtih said transverse passages for the delivery of fluid under pressure to operate the piston.

7. A manipulator comprising a hollow generally cylindrical support, a peel carrier mounted in the support for turning movement generally about its axis and having a hollow generally cylindrical portion whose outside diameter is substantially less than the inside diameter of the opposed portion of the support, sealing rings sealing the peel carrier to the support adjacent the ends of said portions of the peel carrier and support, another sealing ring sealing the peel carrier to the support at a zone intermediate said ends and a spacing ring between the last mentioned sealing ring and each of the first mentioned sealing rings, each of the spacing rings having a passage therethrough, a peel operator having a piston within and operable axially of the generally cylindrical portion of the peel carrier, the peel carrier having ports for admission of fluid at opposite ends of the piston respectively communicating with the passages through the spacing rings and the support having fluid passages respectively communicating with the passages through the spacing rings for the delivery of fluid under pressure to operate the piston.

8. A manipulator comprising a hollow generally cylindrical support, a peel carrier mounted in the support for turning movement generally about its axis and having a hollow generally cylindrical portion whose outside diameter is substantially less than the inside diameter of the opposed portion of the support, sealing rings sealing the peel carrier to the support adjacent the ends of said portions of the peel carrier and support, another sealing ring sealing the peel carrier to the support at a zone intermediate said ends, a spacing ring between the last mentioned sealing ring and each of the first mentioned sealing rings, each of the spacing rings having a passage therethrough, the peel carrier having an abutment portion abutting the outer end of one of the first mentioned sealing rings, removable means carried by the peel carrier normally bearing against the outer end of the other of said first mentioned sealing rings to maintain the sealing rings and spacing rings in position and when removed permitting removal and replacement of the sealing rings and spacing rings, a peel operator having a piston within and operable axially of the generally cylindrical portion of the peel carrier, the peel carrier having ports for admission of fluid at opposite ends of the piston respectively communicating with the passages through the spacing rings and the support having fluid passages respectively communicating with the passages through the spacing rings for the delivery of fluid under pressure to operate the piston.

9. A manipulator comprising a support, a hollow generally cylindrical peel carrier carried by the support for turning movement generally about its axis, a peel operator having a portion disposed within the peel carrier and a portion projecting from an end thereof operatively displaceable generally axially of the peel carrier and a removable and replaceable sealing unit disposable in the end of the peel carrier through which the peel operator projects sealing the peel operator to the peel carrier while permitting operative displacement of the peel operator generally axially of the peel carrier.

10. A manipulator comprising a support, a hollow generally cylindrical peel carrier carried by the support for turning movement generally about its axis, a peel operator having a piston disposed and operable within the peel carrier and a portion connected with the piston and projecting from an end of the peel carrier, means for admitting fluid under pressure within the peel carrier to operate the piston and sealing means at the end of the peel carrier through which the peel operator projects sealing the peel operator to the peel carrier to minimize leakage of fluid therebetween from within the peel carrier while permitting operative displacement of the peel operator generally axially of the peel carrier.

11. A manipulator comprising a generally upright guideway, a crosshead movable in the guideway to selected elevations, a support cantilever-mounted on the crosshead, a hollow generally cylindrical peel carrier carried by the support for turning movement generally about its axis and a peel operator disposed within the peel carrier and operatively displaceable generally axially of the peel carrier.

12. A manipulator comprising a wheeled carriage, a generally upright guideway carried by the carriage, a crosshead movable in the guideway to selected elevations, a support cantilever-mounted on the crosshead, a hollow generally cylindrical peel carrier carried by the support for turning movement generally about its axis and a peel operator disposed within the peel carrier and operatively displaceable generally axially of the peel carrier.

13. A manipulator comprising a carriage, means upon which the carriage is mounted for movement from place to place upon a floor or track, a generally upright guideway carried by the carriage, means for tilting the guideway to selected angles to the horizontal, a crosshead movable in the guideway to selected elevations, a support cantilever-mounted on the crosshead, a hollow generally cylindrical peel carrier carried by the support for turning movement generally about its axis and a peel operator disposed within the peel carrier and operatively displaceable generally axially of the peel carrier.

14. A manipulator comprising a lift truck having a generally upright guideway, a crosshead movable in the guideway to selected elevations, a hollow generally cylindrical support cantilever-mounted on the crosshead, a hollow generally cylindrical peel carrier mounted in the support for turning movement generally about its axis and a peel operator disposed within the peel carrier and operatively displaceable generally axially of the peel carrier.

15. A manipulator comprising a lift truck having a generally upright guideway, a crosshead movable in the guideway to selected elevations, a hollow generally cylindrical support cantilever-mounted on the crosshead, a hollow generally cylindrical peel carrier mounted in the support for turning movement generally about its axis and a peel operator having a piston within and operable axially of the peel carrier, the peel carrier having ports for the admission of fluid at opposite ends of the piston and the support having fluid passages communicating respectively with said ports.

16. A manipulator comprising a base, a support generally in the form of a hollow cylinder connected with the base, a hollow generally cylindrical peel carrier carried by the support for turning movement generally about the axis of the peel carrier, the peel carrier having bearing both within the support adjacent one end of the support and upon the outer surface of the support adjacent the opposite end of the support, means cooperating with the peel carrier at the portion thereof having bearing upon the outer surface of the support for turning the peel carrier and a peel operator disposed within the peel carrier and operatively displaceable generally axially of the peel carrier.

17. A manipulator comprising a base, a support generally in the form of a hollow cylinder removably connected with the base at one end only of the support, the support being open at its opposite end, a hollow generally cylindrical peel carrier mounted in the support and projecting from the open end of the support, bearing means within the support fixedly positioned axially of the support, the peel carrier being mounted in the bearing means for turning movement generally about its axis, and removable means connected with the peel carrier and abutting the bearing means maintaining the peel carrier against withdrawal from the support through the open end of the support.

18. A manipulator comprising a hollow generally cylindrical support, a peel carrier mounted in the support for turning movement generally about its axis and having a hollow generally cylindrical portion whose outside diameter is substantially less than the inside diameter of the opposed portion of the support, sealing means sealing the peel carrier to the support adjacent the ends of said portions of the peel carrier and support and also at a zone intermediate said ends whereby transverse passages are provided between the sealing means at said zone and the sealing means at said ends respectively, the sealing means being mounted upon and forming a unit with the peel carrier, a peel operator having a piston within and operable axially of the generally cylindrical portion of the peel carrier, the peel carrier having ports for admission of fluid at opposite ends of the piston respectively communicating with said transverse passages and the support having fluid passages respectively communicating with said transverse passages for the delivery of fluid under pressure to operate the piston.

19. A manipulator comprising a hollow generally cylindrical support, a closure plate closing one end of the support, the closure plate extending substantially at right angles to the axis of the support, the opposite end of the support being open, a hollow generally cylindrical peel carrier mounted in the support for turning movement generally about its axis and projecting from the open end of the support and a peel operator disposed within the peel carrier and operatively displaceable generally axially of the peel carrier.

20. A manipulator comprising a hollow generally cylindrical support, a hollow generally cylindrical peel carrier mounted in the support for turning movement generally about its axis, the peel carrier having bearing with respect to the support adjacent the respective ends of the support including combination radial and double thrust bearing means adjacent at least one end of the support, and a peel operator having a piston within and operable axially of the peel carrier, the peel carrier having means for the admission of fluid at opposite ends of the piston.

21. A manipulator comprising a hollow generally cylindrical support, a hollow generally cylindrical peel carrier carried within the support for turning movement generally about the axis of the peel carrier, the peel carrier having bearing with respect to the support adjacent the respective ends of the support including combination radial and double thrust bearing means adjacent at least one end of the support, the peel carrier projecting from an end of the support, a hollow peel connected with the projecting portion of the peel carrier, means directly connected with the projecting portion of the peel carrier for turning the peel carrier and peel and a peel operator disposed within the peel carrier and peel and operatively displaceable generally axially of the peel carrier and peel.

References Cited in the file of this patent

UNITED STATES PATENTS

| | | |
|---|---|---|
| 1,106,988 | Swindell | Aug. 11, 1914 |
| 1,881,169 | Brosius | Oct. 4, 1932 |
| 2,578,070 | Jones | Dec. 11, 1951 |
| 2,677,475 | Davies et al. | May 4, 1954 |